(12) United States Patent  
Reid et al.

(10) Patent No.: US 11,979,070 B2  
(45) Date of Patent: May 7, 2024

(54) ELECTRICAL MACHINE COIL INSULATION SYSTEM AND METHOD

(71) Applicant: Integrated Power Services LLC, Greenville, SC (US)

(72) Inventors: Ray Thomas Reid, Greer, NC (US); Mark D. Nikrandt, Pittsburgh, PA (US); Donald Dolence, Pittsburgh, PA (US); David N. Scherer, Friendswood, TX (US)

(73) Assignee: Integrated Power Services LLC, Greenville, SC (US)

( * ) Notice: Subject to any disclaimer, the term of this patent is extended or adjusted under 35 U.S.C. 154(b) by 986 days.

(21) Appl. No.: 13/774,014

(22) Filed: Feb. 22, 2013

(65) Prior Publication Data

US 2013/0221790 A1    Aug. 29, 2013

Related U.S. Application Data

(60) Provisional application No. 61/602,903, filed on Feb. 24, 2012.

(51) Int. Cl.
*H02K 3/40* (2006.01)
*H01B 19/00* (2006.01)
(Continued)

(52) U.S. Cl.
CPC .............. *H02K 3/40* (2013.01); *H01B 19/00* (2013.01); *H02K 3/345* (2013.01); *Y10T 29/49227* (2015.01)

(58) Field of Classification Search
CPC ............ H02K 3/40; H02K 3/32; H02K 15/00; H02K 15/10; H02K 3/42
(Continued)

(56) References Cited

U.S. PATENT DOCUMENTS 3,662,199 A * 5/1972 Anderson .............. H02K 15/12  
310/208  
3,823,334 A * 7/1974 Philofsky ................. H02K 3/32  
174/127

(Continued)

FOREIGN PATENT DOCUMENTS

GB          816699  *  7/1959  ............... H02K 3/40  
JP      2011193727  *  9/2011  ............... H02K 3/40

OTHER PUBLICATIONS

G.Stone et al. "Electrical Insulation for Rotating Machines" 2004, pp. 1-128.*

(Continued)

*Primary Examiner* — Burton S Mullins  
(74) *Attorney, Agent, or Firm* — Fletcher Yoder P.C.

(57) ABSTRACT

An insulation system and method are disclosed for insulating formed coils of electrical machines, such as motors and generators. The system includes strand/turn insulation that may include one or more layers of different materials, depending upon the dielectric requirements. A ground wall insulation is applied over the group of turns. The coil may be sized in a slot cell section. Additional insulation layers are provided, including a slot corona suppression insulation that extends just beyond stator slots, a voltage grading layer, and an armor layer. The resulting system is highly adaptable to different machine designs and ratings, and affords superior resistance to degradation.

10 Claims, 6 Drawing Sheets

(51) Int. Cl.
*H02K 3/30* (2006.01)
*H02K 3/34* (2006.01)

(58) Field of Classification Search
USPC ............ 174/120 R, 120 SC, 122 R, DIG. 20, 174/DIG. 22, DIG. 26–DIG. 31; 310/196
See application file for complete search history.

(56) References Cited

U.S. PATENT DOCUMENTS

| | | | | | |
|---|---|---|---|---|---|
| 4,001,616 | A | * | 1/1977 | Lonseth | H02K 3/40 174/102 SC |
| 4,260,924 | A | * | 4/1981 | Lugosi | H02K 3/04 174/15.6 |
| 4,297,250 | A | * | 10/1981 | Gupta | H01C 7/112 252/519.3 |
| 4,427,740 | A | * | 1/1984 | Stackhouse | C08G 59/24 29/596 |
| 5,925,944 | A | * | 7/1999 | Emery | H02K 3/40 174/127 |
| 6,420,812 | B1 | * | 7/2002 | Emery | H02K 3/40 174/120 R |
| 6,498,415 | B1 | * | 12/2002 | Emery | H02K 3/40 174/120 R |
| 6,559,384 | B1 | * | 5/2003 | Angell | H02K 3/48 174/116 |
| 6,836,204 | B2 | * | 12/2004 | Reid | H02K 15/10 29/605 |
| 7,268,293 | B2 | * | 9/2007 | Smith | H02K 3/30 174/110 R |
| 7,427,712 | B2 | * | 9/2008 | Emery | H02K 3/40 174/110 R |
| 7,634,852 | B2 | * | 12/2009 | Sternberg | H02K 3/22 174/120 R |
| 8,097,996 | B1 | * | 1/2012 | Rao | H02K 3/34 310/215 |
| 8,952,256 | B2 | * | 2/2015 | Baumann | H02K 3/40 174/138 C |
| 9,059,616 | B1 | * | 6/2015 | Rao | H02K 3/30 |

OTHER PUBLICATIONS

F.T.Emery "Stator Coil Insulation for Modern Air-Cooled Generators" Electrical Insulation Conference and Electrical Manufacturing and Coil Winding Conference. 25:185-188. IEEE, 2001. (Year: 2001).*

Sharifi, E.; Jayaram, S. H.; Cherney, E. A.. "Temperature and electric field dependence of stress grading on form-wound motor coils" IEEE Transactions on Dielectrics and Electrical Insulation. 17(1) 264-270; 2010. AN: RN265923699 (Year: 2010).*

Brütsch, R. Chapman, M.. "Insulating systems for high voltage rotating machines and reliability considerations" 2010 IEEE International Symposium on Electrical Insulation Electrical Insulation (ISEI), Conference Record of the 2010 IEEE International Symposium Jun. 1-5, 2010. (Year: 2010).*

G.Lister, R.Lefebvre, L.Kohn Epoxy Mica Mat (TM) Class F Stator Ground Wall Insulation by Canadian General Electric-Manufacture and quality assurance Proceedings of the 16th Electrical/Electronics Insulation Conference: 152-6;441. IEEE. (1983) (Year: 1983).*

John G. Webster Wiley Encyclopedia of Electrical and Electronics Engineering Dec. 27, 1999 pp. 333-340 (Year: 1999).*

Mitsui, H.; Inoue, Y.; Yoshida, H "Influence of mica tape application on insulation characteristics of high voltage rotating machinery coils" IEEE Transactions on Electrical Insulation-20.3: 619-24. (Jun. 1985) (Year: 1985).*

Conley, D. J.; Frost, N.. "Fundamentals of semi-conductive systems for high voltage stress grading" Proceedings: Electrical Insulation and Electrical Manufacturing Conference (IEEE Cat. No. 05CH37683): 89-92; xxiii+482. IEEE. (2005) (Year: 2005).*

G.Stone, E.Boulter, I.Culbert,H. Dhirani Electrical Insulation for Rotating Machines: Design, Evaluation, Aging, Testing, and Repair 2004 Chap.1 pp. 1-41 "Rotating Machine Insulating Systems" (Year: 2004).*

* cited by examiner

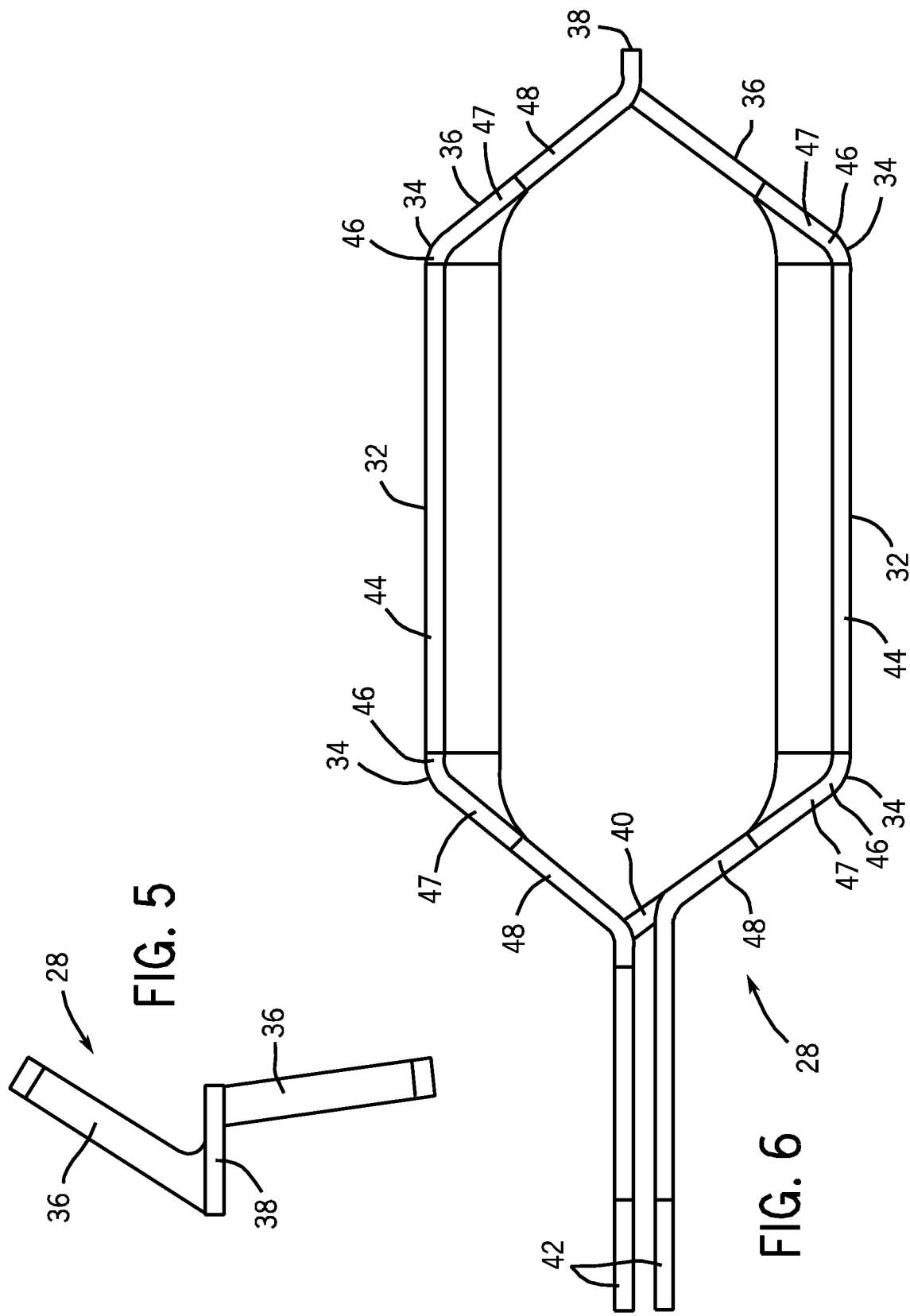

ELECTRICAL MACHINE COIL INSULATION SYSTEM AND METHOD

CROSS REFERENCE TO RELATED APPLICATIONS

This application is a Nonprovisional patent application of U.S. Provisional Patent Application No. 61/602,903, entitled "Motor Insulation System and Method", filed Feb. 24, 2012, which is herein incorporated by reference.

BACKGROUND

The invention relates generally to motor winding and insulation, and in particular to multi-layer, high performance insulation systems for use in demanding applications.

A number of insulation systems and techniques have been developed and are in use for motors, generators, and other rotating electrical machines. In general, such machines include a stator, and a rotor that is disposed in the stator and is caused to rotate under the influence of electric fields generated by the stator (in the case of a motor), or that is driven and itself creates a field that induces current flow in the stator (in the case of a generator). In most such machines, both the stator and the rotor comprise a core and coils or windings of conductive material that carries current in operation. Such coils must generally be insulated from both the core material as well as from one another.

Insulation systems for motors and generators take various forms, which may be more or less elaborate depending upon such factors as the nature of the machine, the voltage and currents encountered during operation, the voltage differences between neighboring coils, the power rating of the machine, and so forth. In simple systems, varnish or resinous insulation may suffice. However, in higher powered, higher voltage, and larger machines much more demanding conditions exist either continuously or during periods of operation, requiring more complex, often multi-layer insulation systems.

Coil insulation systems serve several purposes, and these differ somewhat at different locations along the coil and in different environments. For example, because coils are typically forced into slots within the stator and rotor cores, insulation must withstand mechanical treatment during manufacture, and maintain potential differences between the coil and the surrounding slot material. Similarly, multiple coils are often placed in each slot, and these coils experience different potentials during operation. The insulation systems must thus maintain and reduce this difference without breakdown. At coil ends (outside the core), the coils are often in close proximity with one another, and so must also maintain potential differences at these locations.

Such insulation systems are applied both initially, during manufacture of the machines, and may also be applied during reworking or servicing. At both stages, improvements are needed to existing insulating techniques. For example, existing systems still suffer from corona breakdown under certain operating conditions. Moreover, the core materials and coil conductors essentially provide the only parts of the machine that contribute usefully to the power output of motors or of power created in generators. Insomuch as the insulation system occupies valuable space in the machine, reductions in its size, improvements in performance, or both, allow for improved machine performance, increased power rating, reduced derating, and so forth. Because the insulation systems are applied both initially and during the life of the machines, such improvements offer advantages in original designs as well as in retrofitting opportunities.

BRIEF DESCRIPTION

The invention provides a multi-layer insulation system for motors and other electrical machinery that can be adapted to particular voltages, current and flux densities, winding configurations and so forth to provide enhanced performance and resistance to corona breakdown. The systems and method of the invention may be utilized in both new machine fabrication as well as in reworking applications that improve performance as compared to original manufacturer insulation system.

DRAWINGS

These and other features, aspects, and advantages of the present invention will become better understood when the following detailed description is read with reference to the accompanying drawings in which like characters represent like parts throughout the drawings, wherein:

FIG. 5 is an end view of a coil of the type shown in FIG. 4;

FIG. 6 is a bottom view of the coil shown in FIGS. 4 and 5, illustrating an exemplary placement of components of the insulation system;

DETAILED DESCRIPTION

Figure 1:
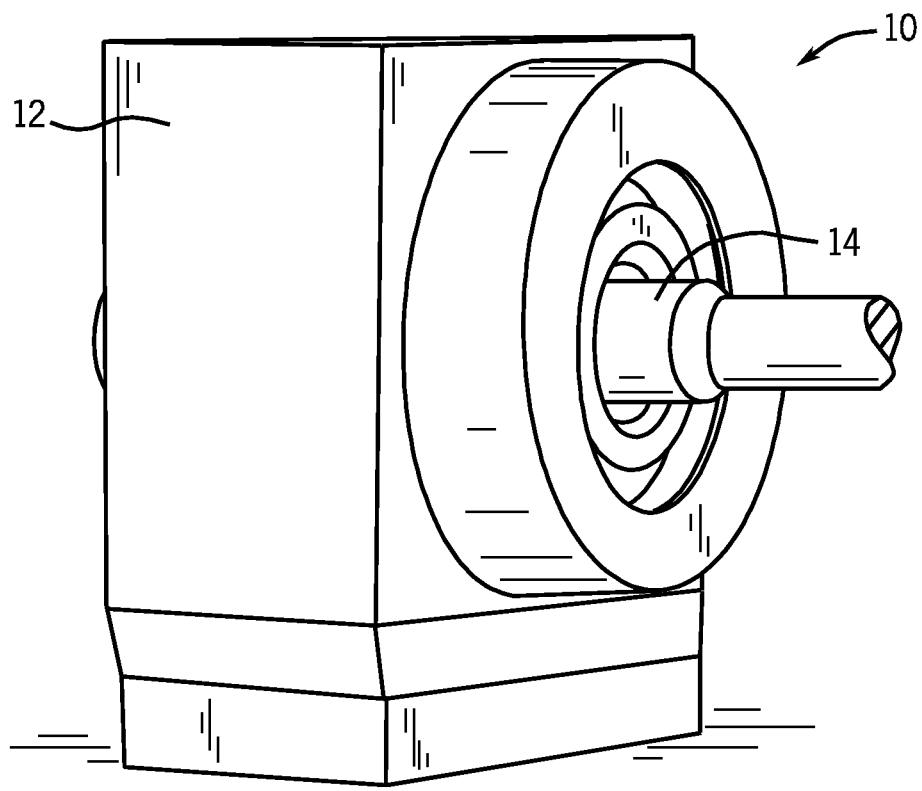
FIG. 1 is a perspective view of an exemplary electrical machine in which the present coil insulating techniques may be applied.

Turning now to the drawings, the insulation system and technique described in the present disclosure may be applied to a variety of electrical machines, and in particular to motors and generators. An exemplary motor is illustrated in FIG. 1. The motor 10 generally comprises, in this view, a housing 12 from which a shaft 14 extends. As will be appreciated by those skilled in the art, by interaction of electrical currents and fields within the motor, the shaft is cause to rotate. Various loads may be attached the shaft and these will be driven in rotation to perform useful work. If the insulation system is applied to a generator, this process is generally reversed. That is, the shaft will be driven, such as by a turbine or other power source, and electrical power will be generated by interaction of currents and fields within the generator. Many different styles, types, sizes, voltage ratings, and so forth may be accommodated by the present insulation techniques. However, the techniques are particularly well-suited to large motors and generators, such as on the order of approximately 6,900 to 16,000 volts. Power ranges for the insulation system may vary, for example, between 1000 kW and 40,000 kW. In general, these machines will be multi-phase, such as three-phase in the case of most motors.

Figure 2:
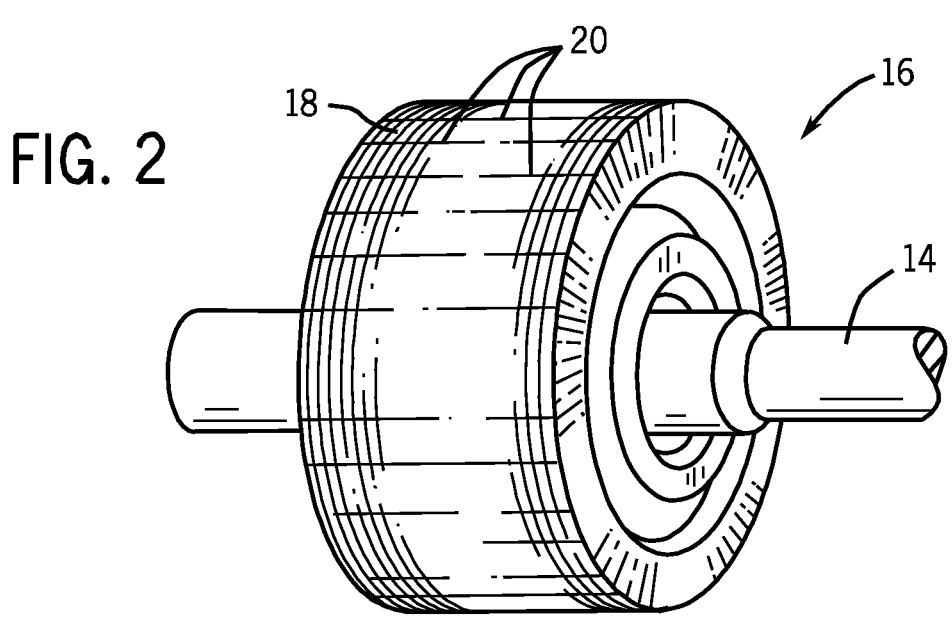
FIG. 2 is a perspective view of an exemplary rotor of such a machine.

FIG. 2 illustrates an exemplary rotor 16 from a motor of the type shown in FIG. 1. The shaft 14 extends from the rotor and mechanical components link the shaft to the rotor core 18. The rotor core will have a series of slots 20 in which rotor windings are disposed. The windings may be interconnected based upon the particular motor design, the speed of the motor, ratings of the motor, the number of poles in the motor, and so forth.

Figure 3:
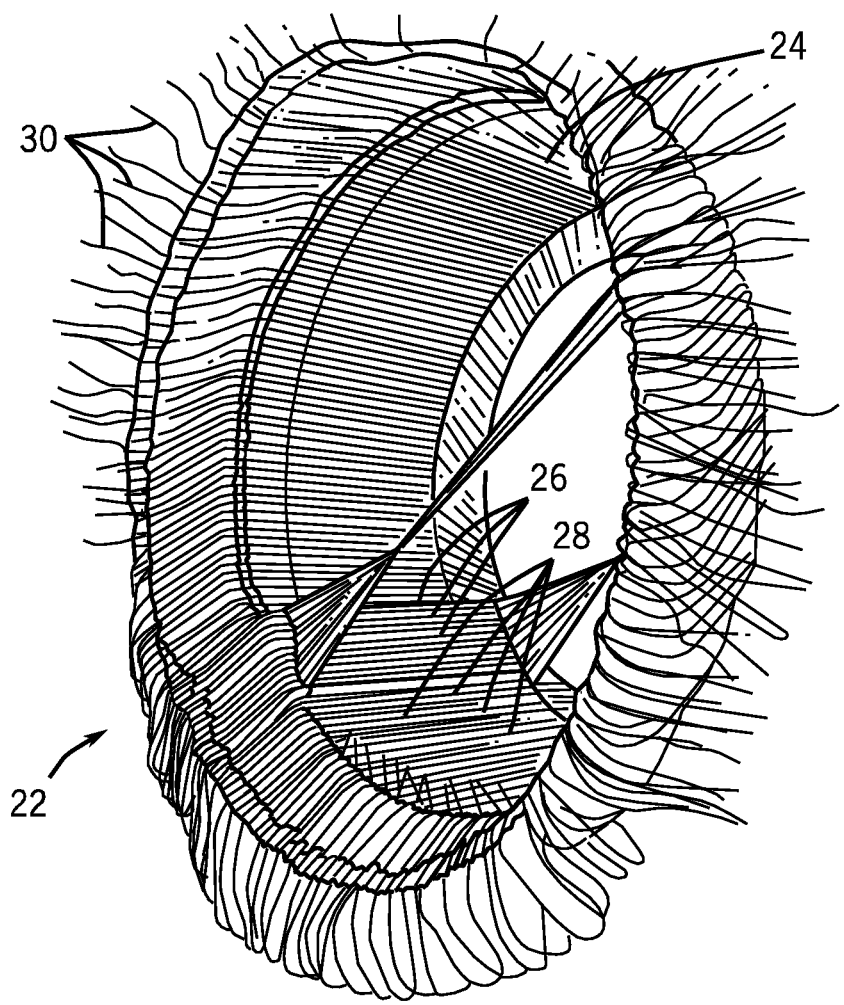
FIG. 3 is a perspective view of a portion of a stator in which coils insulated in accordance with the present disclosure are being installed.

FIG. 3 illustrates an exemplary stator for a motor of the type shown in FIG. 1, in the process of construction. The stator 22 is mounted and statically held within the housing of the machine, and the rotor is later placed within the assembled stator, supported by bearings, such that it may rotate within the stator. A large central opening is therefore provided in the stator core 24. Around the inner periphery of the stator core 24 are a series of slots 26. The length, number, and position of the slots may vary depending upon the number of poles in the machine, the power rating of the machine, the number of phases, and so forth. In particular, windings or coils 28 are disposed in the slots, and in many cases multiple coils (e.g., two) may be disposed in each slot. Various slot geometries, winding patterns and combination of windings within the slots may be employed, again depending upon the motor design. In general, the coils may have leads that extend through a single end of the motor stator core, or leads may extend from both sides. The leads 30 are ultimately laced and interconnected to form groups and phases of the stator. The interconnections may thus allow for multi-phase operation, while providing a desired number of poles and a suitable winding configuration (e.g., wye or delta).

The present disclosure is directed in particular toward formed coils. That is, the coils disposed in the stator slots are formed and insulated prior to installation in the slots, with certain operations being performed following installation (e.g., vacuum pressure, integration, or "VPI"). Such formed coils are generally essentially complete prior to installation into the stator slots, and form what can be large, generally rigid structures containing the electrical conductors that will carry current and generate electrical fields or be influenced by electrical fields during operation. As will be appreciated by those skilled in the art, significant potential differences may be developed between the coils in the stator slots, between the coils and the stator core material, between adjacent coils at ends of the stator, and so forth. The present insulation system and techniques allow for maintaining such potential differences while avoiding breakdown of the insulation system that can cause premature failure or degrade a performance characteristic of a machine.

Figure 4:
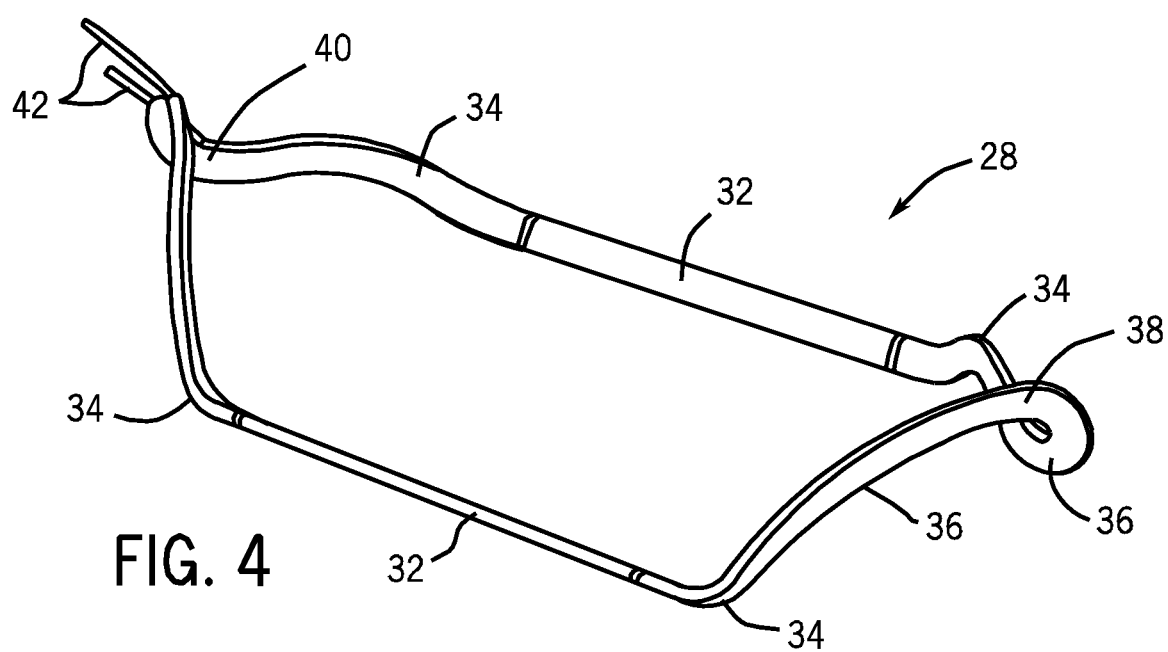
FIG. 4 is a perspective view of an exemplary formed coil on which the insulation system may be applied.

FIG. 4 illustrates an exemplary formed coil insulated in accordance with the present disclosure. The coil 28 generally includes two slot cell sections 32 opposite one another that are configured and insulated to fit within slots of the stator core. On ends of the slot cell sections, bends 34 are formed. The coil illustrated in FIG. 4 has end arms 36 joined by an end winding 38 to form a loop that is completed by a knuckle 40 around which conductors extend prior to being terminated at leads 42. Electrically, then, the coil comprises a circuit that begins at one lead, winds around multiple turns comprised in the various sections of the coil, and that terminates again in the opposite lead. As described in more detail below, the various sections of the coil are insulated in specific ways to provide optimal performance and resistance to degradation, particularly corona breakdown.

An end view of the coil is illustrated in FIG. 5, while a bottom view is illustrated in FIG. 6 in which the multiple different types of insulation layers are called out. As can be seen in FIG. 5, the end winding 38 extends between the end arms 36 and completes the loop of the conductors within the coil winding. As shown in FIG. 6, this structure places both leads 42 at one end in a loop arrangement comprising the slot cell sections 32, the bends 34, and end arms 36, the end winding 38, and the knuckle 40. Insulation is applied to these various sections both prior to, during, and following forming of the sections. That is, certain portions of the insulation are applied, followed by forming, then by application of additional insulation as described below.

As shown in FIG. 6, the insulation system, from a coil geometry standpoint, may be considered to have several regions. First, in a slot cell section insulation system 44 is disposed over the slot cell sections 32. This insulation system is designed to isolate individual strands (where desired) from one another, individual turns from one another, and the slot cell sections from other slot cavity sections in slots of the machine core, as well as from the machine core material itself. The slot cell section insulation system comprises multiple layers as described more fully below. A voltage suppression layer 46 extends across and beyond the slot cell section insulation system and allows for reduction of surface voltage stress where the coil contacts the stator core. A semiconductive voltage gradient tape 47 is employed on the coil extension 48. The gradient tape layer overlaps the corona suppression tape and extends toward the coil end turn and knuckle on both ends of the coil. The gradient tape layer allows for safe reduction of the voltage stresses that exist at the termination of the corona suppression tape. An armor tape layer 48 extends beyond the voltage grading layer and covers the coil end arm extensions including the end turn and knuckle sections.

Figure 7:
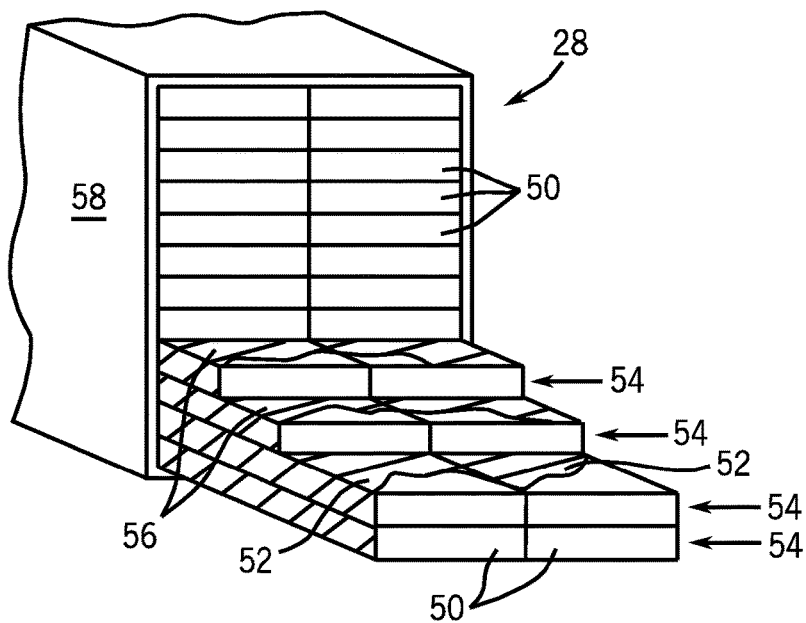
FIG. 7 is a perspective view of an exemplary coil comprising a number of turns of a conductor and elements of the insulation system.
Figure 8:
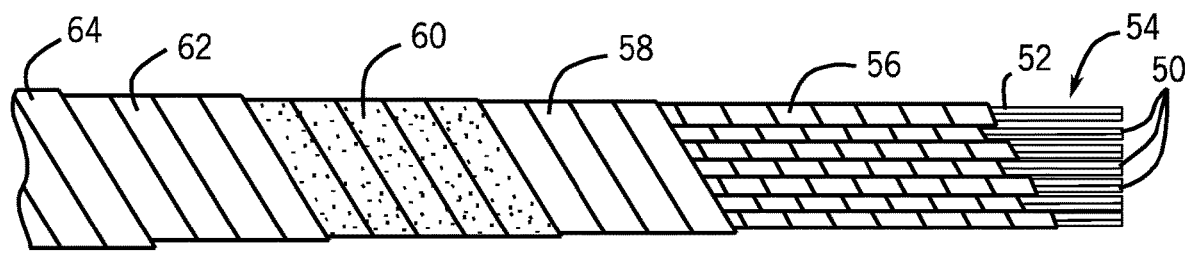
FIG. 8 is a diagrammatical side view of an exemplary coil with components of the insulation system.
Figure 9:
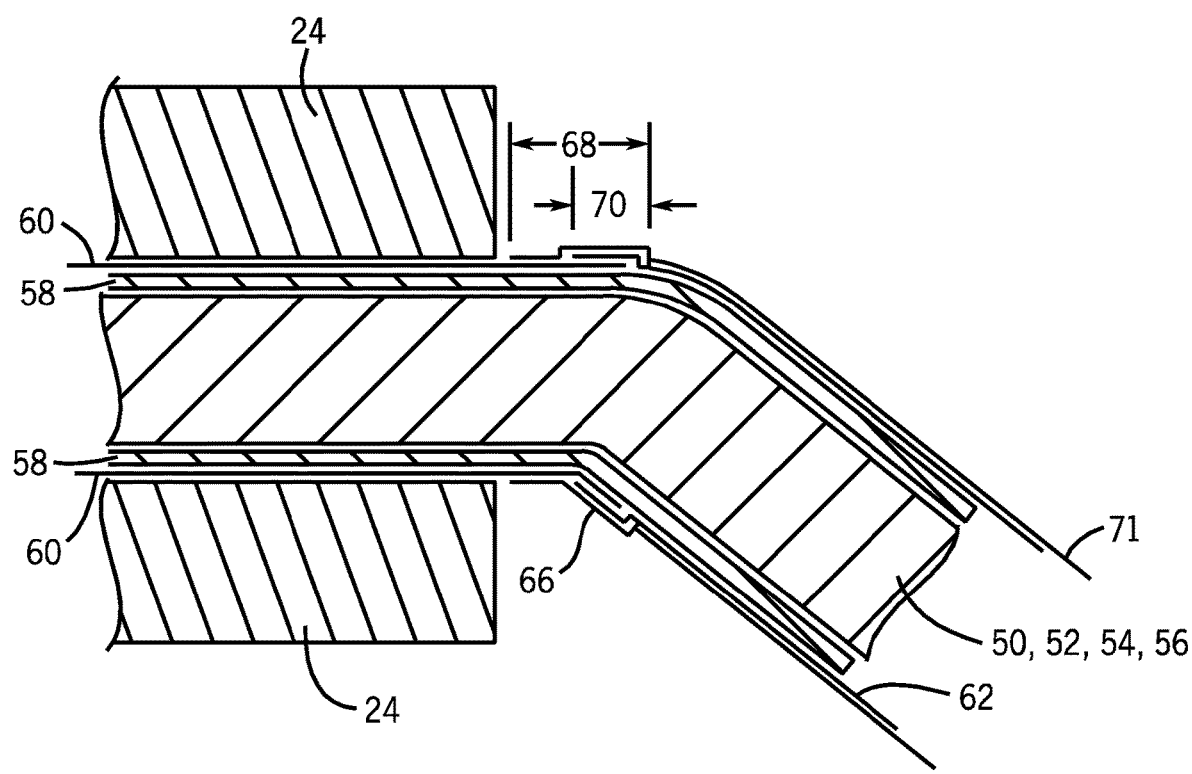
FIG. 9 is a diagrammatical sectional view of an exemplary coil showing components of the insulation system adjacent to an end of a stator core.

FIGS. 7, 8 and 9 illustrate the various layers of insulation in somewhat greater detail. As best shown in FIG. 7, each coil may comprise a number of individual conductors 50. These conductors are typically rectangular in cross-section and may be stacked vertically, horizontally or both. The conductors are generally made of copper, although various alloys and other materials may be employed. Where desired, the individual conductors may comprise a first level of insulation that is referred to herein as strand insulation 52. In present embodiments this strand insulation may comprise one or more layers of material that is wrapped around the individual conductor in an overlapped arrangement. At least some of the strand insulation 52 may typically be in a tape form, as are other portions of the insulation system described herein. One or more strands may then form a turn 54. In the illustrated embodiment, side-by-side strands form each turn 54. Each turn may then be insulated from other turns by turn insulation (e.g., mica-containing turn tape). With the insulated turns stacked in the formed coil, the insulation system then includes a ground wall insulation 58 that surrounds all turns of the coil. The ground wall insulation, the turn insulation and the strand insulation (where used) will generally extend over the entire length of the coil, including the slot cell sections, the bends, the end arms, the end turn, and the knuckle.

FIG. 8 illustrates successive layers of insulation as may be provided on an exemplary coil. As noted above, the coil essentially contains conductors 50 over which strand insulation 52 may be applied. The turn insulation 56, then, is provided over each successive turn. The ground wall insulation 58 is provided over all of the turns and thereby over all of the turn insulation. A slot corona suppression layer 60 is then provided at certain locations over the ground wall insulation. A further layer of insulation, referred to herein as a voltage grading layer 62 may be provided beyond the slot corona suppression layer 60. Finally, an armor insulation 64 is provided at certain locations around the coil as described below.

Referring back to FIG. 6, and keeping in mind the various insulation layers mentioned with reference to FIGS. 7 and 8, the slot cell sections 32 will typically include strand/turn insulation as well as ground wall insulation. The slot corona suppression layer 60 is provided over the ground wall insulation in the areas where the coil will be placed in the stator slots (i.e., over the slot cell sections). The slot corona suppression insulation extends beyond portions of the coil that will be placed in the slots, that is, beyond the outer extremities of the stator core. In presently contemplated embodiments, this slot corona suppression insulation extends beyond the ends of the stator core a minimum of 1 inch, although other extensions may be utilized. In general, this insulation may extend to the first bend of the coil beyond the slot cell sections. The slot corona suppression insulation is placed over the ground wall insulation, and may comprise a conductive tape as described below.

The voltage grading layer 62 is overlapped with the slot coronal suppression insulation, and is typically made of a stress grading tape. Referring to FIG. 9, the slot corona suppression insulation 60 is illustrated extending beyond the stator core slot, with the voltage grading layer overlapping in a region 66. In a presently contemplated embodiment, for example, the distance 68 is again approximately 1 inch. The insulations may overlap by a distance 70, such as approximately ¾ inches. Here again, from this point the voltage grading layer may extend approximately 6 inches or so onto the end arm or near the area where the coil is bent.

Referring back to FIGS. 6 and 8, the armor insulation layer 71 comprises a tape that is wound over ends of the coil, and may be wound at least partially over the gradient tape and over the ground wall insulation outside of the slot cell cavity sections. The resulting insulation system is highly adaptable to various coil configurations, voltage ratings, dielectric requirements, and a host of other electrical machine specifications. The following tabulated summary outlines certain presently contemplated combinations of these layers along with their performance and selection criteria:

Strand/turn insulation components
  One Component—Film

| typical | build (inches) | dielectric strength (V/mil) |
|---|---|---|
| heavy | 0.003-0.004 | 750-950 |
| quad | 0.005-0.006 | 750-900 |

Two Component—Glass/Film

| typical | build (inches) | dielectric strength (V/mil) |
|---|---|---|
| SDG/HF | 0.010-0.011 | 470-520 |
| SDG/QF | 0.011-0.012 | 550-600 |
| DDG/HF | 0.014-0.015 | 490-520 |
| DDG/QF | 0.015-0.016 | 550-580 |

Additional Component—Mica/Film

| typical | build (inches) | dielectric strength (V/mil) |
|---|---|---|
| mica/film | 0.016-0.020 | 650-810 |

Additional Component—Micafold

| typical | build (inches) | dielectric strength (V/mil) |
|---|---|---|
| micafold | 0.013 | 1014 |

Additional Turn Insulation—Turn Tape/Film

| typical | build (inches) | dielectric strength (V/mil) |
|---|---|---|
| tape/1HL film | 0.024-0.028 | 640-695 |
| tape/2HL film | 0.048-0.056 | 570-660 |

Where "heavy" indicates thick build enamel, "quad" indicates thick build plus an additional coat of enamel, "SDG" indicates "single glass layer" (e.g., one wrap), "DDG" indicates "double glass layer" (e.g., two wraps), "HF" indicates heavy film, "QF" indicates quad film, "1HL" indicates a single layer of tape with ½ overlap between successive wraps, "2HL" indicates two layers of tape with ½ overlap between successive wraps, and "micafold" indicates mica tape used for high turn to turn voltage stress applications.

Strand/Turn Insulation Selection

| strand/turn insulation | volts per turn (max) |
|---|---|
| film | 30 |
| SDG/film | 40 |
| DDG/film | 60 |
| mica/film (2BL) | 120 |
| micafold | 160 |
| turn tape/film (1HL) | 180 |
| turn tape/film (2HL) | =>180 |

Ground Wall Insulation

| Typical VPI tapes | three ply | | two ply | |
|---|---|---|---|---|
| total thickness (inches) | 0.009-0.0095 | | 0.0055 | |
| mica content (gm/m$^2$) | 160 | | 160 | |
| Volt. Class (kv) | 6.9 | 11 | 12.47 | 13.8 |
| typ. HL layers | 5 | 7 | 8 | =>8 |
| coil mfg surge test (kv) | 15 | 24 | 27 | 30 |
| coil mfg DC test (kv) | 16 | 24 | 28 | 28 |
| final test AC (kv) | 14.8 | 23 | 25.94 | 28.6 |
| final test DC (kv) | 25.16 | 39.1 | 44.098 | 48.620 |

As noted above, the insulation system is particularly well suited to high voltage applications, such as between 6.9 kV and 16 kV, although the system can also be used in other voltage classes, such as medium voltage machines.

Regarding individual insulation types and layers, the strand insulation, when utilized, will typically provide isolation of the individual strands, and may be used based upon turn-to-turn dielectric requirements. In certain presently contemplated embodiments summarized above, the strand/turn insulation may comprise a film applied over the individual turns and/or strands, such as an underlying coating based on a polyester (amide imide) resin and a superimposed coating based on polyamideimide resins. Moreover, single glass layers may be utilized, where a combination of a single layer of polyester-glass and film are used for the strand/turn insulation. Where used, the glass is an electrical grade filament glass yarn and a polyester utilized is a high grade yarn made from a glycol-acid polymerization. Still further, double layers of polyester glass and film may be used for the strand/turn insulation. In such cases, the glass and polyester are similar to those in the single layer case. In addition, a combination of a mica-contained tape and film may be utilized. In a presently contemplated embodiment, the mica tape comprises a muscovite mica paper impregnated with an electrical grade modified epoxy resin, both sides being covered with a polyethylene terephthalate (PETP) film. Moreover, a micafold layer may be utilized, such as a combination of Nomex (a flame resistant meta-aramid available from E.I. Du Pont De Nemours & Co.) and heavy film. The Nomex may be applied longitudinally and bonded to the film via an epoxy-nylon. Finally, one or more overlapped tapes may be utilized, such as a glass-backed high-porosity mica tape applied over the turned bundle. The mica tape, when utilized, is typically the same material used for the ground wall insulation discussed below, and the strands may be insulated with film, glass or a combination thereof.

As noted above, the various layers of the strand/turn insulation may be selected based upon the desired dielectric strength, as indicated in the tabulated summary above. Moreover, the number and types of successive layers may be selected based upon the anticipated volts per turn potential difference. In general, a film is used, or a combination of glass and film may be used successively. If further potential differences are to be encountered, the mica/film layer, micafold, and tape/film layers may be added.

In presently contemplated embodiments, the ground wall insulation is then applied over the strand/turn insulation. The ground wall insulation is typically applied with two opposing tape rolls using a ½ width overlap between successive wraps with a ¼ lap index. To optimize the insulation system the tape tension is controlled at approximately 16-18 ft-lbs by an automatic taping machine. The final size is then checked with a slot fit gage to ensure that the insulated coil will fit within the stator slots. As also summarized in the tabulated summary above, the mica content of the ground wall insulation is preferably high, on the order of 160 gm/m². The number of ½ wrapped layers may be selected based upon the operating voltage and rating of the machine, as noted above.

The slot corona suppression insulation is also applied as a tape, and may be referred to as a shielding tape. In presently contemplated embodiments, the slot corona suppression insulation may be considered as a ground wall partial discharge suppression layer that bleeds the high voltage stress away from the coil that would otherwise result in corona and partial discharge. This tape is applied over the ground wall tape. Partial discharges created by high-voltage stress that occurs in the ground wall of the coil rated above approximately 4-5 kv may be suppressed to prevent partial discharge between the surface of the coils and the stator core. In presently contemplated embodiments, the slot corona suppression tape is applied in one ½ overlap layer. The shielding tape may consist of a polyester fleece impregnated with a graphite-loaded resin, for example. A conductive laminate may be used in the slots for a bottom stick, center filler and top slider under the slot wedge (not shown) where desired. Moreover, the slot corona suppression tape usually extends through the center of each bend or through the straight portion of the coil, as discussed above. The tape application tension for the slot corona suppression tape, when applied, is held to a lower level than that used for the ground wall tape to prevent wrinkling or buckling of the ground wall tape.

Further, the voltage grading layer may also be referred to as a stress grading tape or gradient tape. This is typically applied in one layer with ½ width overlap between wraps. The length of this insulation depends on the test voltage, and commonly extends between 4 and 6 inches along the coil at each end. The voltage grading layer serves to reduce the surface stress at the end of the slot corona suppression tape outside the stator core. Here again, it is typically applied with a ¾ to 1 inch overlap over the end of the slot corona suppression tape. In a present embodiment, the voltage grading layer is made of a polyester fleece impregnated with a silicon carbide-loaded resin.

Figure 10:
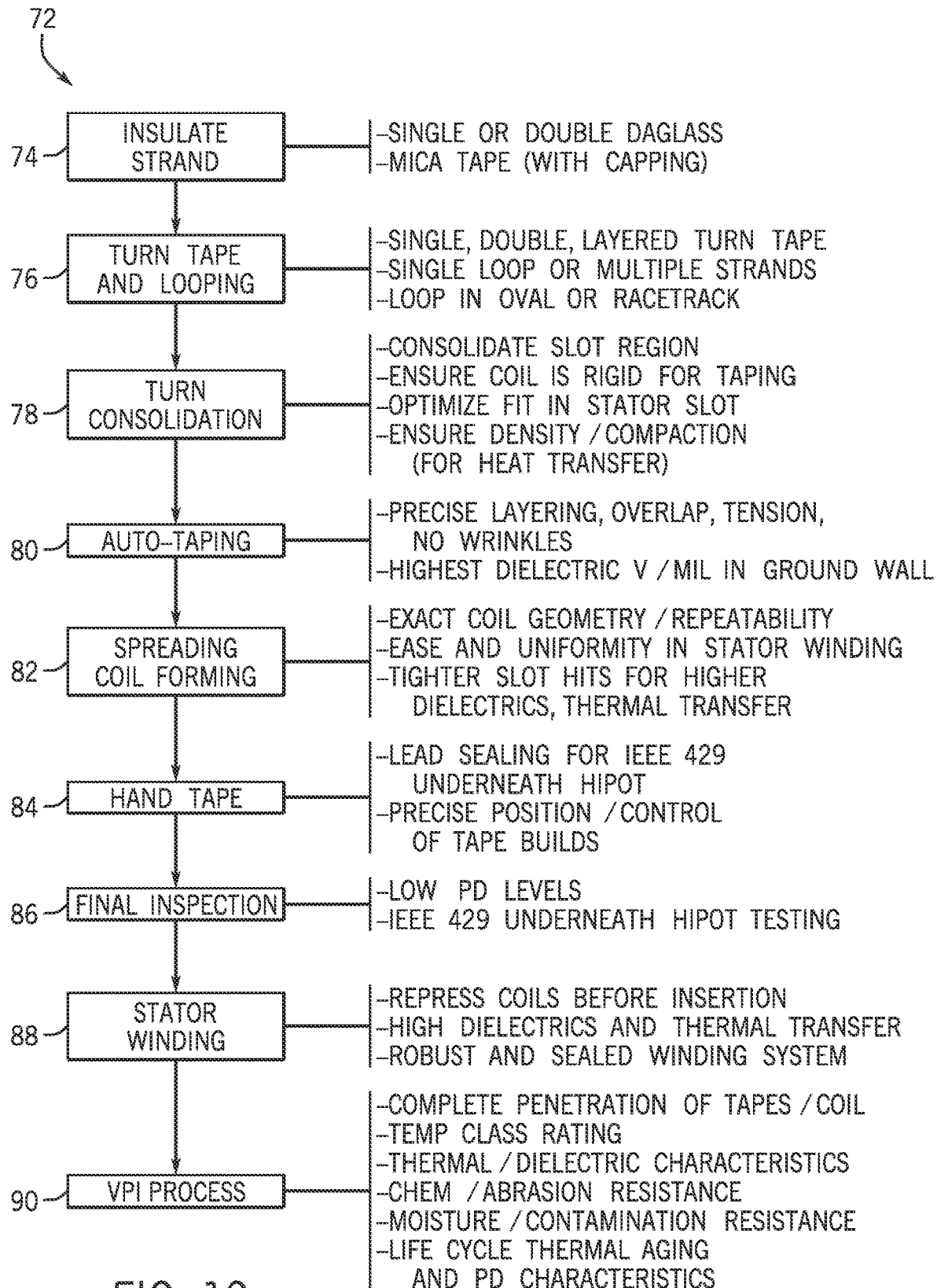
FIG. 10 is a flow chart illustrating steps in creating, insulating and testing the insulation system, along with features and advantages of the steps or phases of the process.

As noted above, the insulation system may be applied at various stages, both by hand and utilizing automatic taping machines. FIG. 10 illustrates exemplary steps in forming and insulating the coils, along with certain details regarding the process, and advantages of each step. The process, designated generally by reference numeral 72, begins with applying any desired strand insulation as indicated at step 74. As noted above, such strand insulation may comprise resins, tapes, and so forth, with the tape being overlapped when required. The strand insulation, again, depends upon the dielectric rating desired for the strands. Subsequently, turn tapes may be applied as indicated at step 76. As noted above, these may comprise single, double and layered turn tapes, which may be applied in single conductor or multiple strand loops. In general, the turn tapes will surround each turn of the coil as it is formed.

At step 78, a forming process is performed that comprises turn consolidation. In general, this a sizing process that consolidates the turns in the slot cell regions to ensure the coil is rigid for taping and optimally sized to fit within the stator slot. The turn consolidation also ensures the desired density and compaction, such as for thermal transfer.

Once consolidated, automatic taping may be performed as indicated at step 80. This automatic taping allows for precise layering, overlapping and tension of the ground wall insulation with no wrinkles or pockets between the turn insulation and within the ground wall insulation. The automatic taping process allows for highest dielectric rating in the ground wall layer.

Subsequently, the coil may be formed at step 82 to ensure proper geometry with the stator core and repeatability of coil nesting. In presently contemplated embodiments, the coil forming is performed via automated control of forming machines, although the process may be more or less automated.

Finally, at step 84 hand taping may be performed, such as for the additional insulation layers as described above (e.g., the end turn and knuckle ground wall layers, the slot corona suppression layer, the voltage grading layer, and the armor tape). Moreover, in this step lead sealing may be performed.

With the coil insulated and formed, a final inspection and testing takes place at step 86, which may include surge, high voltage, and polarization index testing. The coils are then complete and the stator may be wound as indicated at step 88. As will be appreciated by those skilled in the art, this winding process typically comprises positioning and pressing the insulated coils into the stator core slots in accordance with the machine design.

Finally, at step 90 a vacuum pressure impregnation process is performed. The process allows for complete penetration of the tapes in various layers around the coil, provides for the appropriate temperature class rating, as well as for the thermal/dielectric characteristics desired. The completed stator may be subjected to final tests such as water emersion and AC hipot testing. Moreover, this VPI process provides chemical and abrasion resistance, moisture and contamination resistance, and enhances the life of the coil, particularly during cyclic thermal aging and from partial discharge.

Other features and advantages of the insulation system described above are offered. For example, thinner denser groundwalls transfer heat more efficiently reducing electrical losses (e.g., more compact, permitting uprating of the machine).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrical machine formed coil insulation system, comprising:
    turn insulation disposed over each successive turn of the formed coil;
    a mica ground wall insulation comprising multiple layers of a mica-containing tape disposed over multiple turns of the coil wherein the multiple layers comprise an overlap of the mica-containing tape;
    slot corona suppression insulation disposed over the ground wall insulation of slot cell sections of the coil and extending beyond ends of a core of the machine;
    voltage grading insulation disposed over at least a portion of the slot corona suppression insulation and extending beyond the slot corona suppression insulation at ends of the coil; and
    armor insulation disposed over ends of the coil and at least a portion of coil leads, wherein the turn insulation and the multi-layer of mica ground wall insulation extend over the slot cell sections of the coil, and wherein the slot cell sections of the coil are configured to be disposed in a slot cell of the electrical machine, wherein the mica ground wall insulation comprises at least 160 gm/m$^2$ of mica, and wherein the mica-containing tape is wound in ½ lap width overlap at a tension of between 16 to 18 ft-lbs, wherein the coil comprises conductors having a gauge sized for operating at between approximately 6,900 and 16,000 volts.

2. The system of claim 1, wherein individual conductors of each turn comprises a strand insulation disposed between the respective conductor and the turn insulation.

3. The system of claim 1, wherein the turn insulation comprises at least one layer of a mica-containing tape.

4. The system of claim 1, wherein the ground wall insulation comprises multiple plies and a total thickness of between approximately 0.022 inches and 0.165 inches.

5. The system of claim 1, wherein the ground wall insulation comprises two plies and a total thickness of approximately 0.011 inches.

6. The system of claim 1, wherein the slot corona suppression insulation comprises a polyester fleece impregnated with a conductive material loaded resin.

7. The system of claim 1, wherein an application tension of the slot corona suppression insulation does not exceed an application tension of the ground wall insulation.

8. The system of claim 1, wherein the slot corona suppression insulation comprises a tape applied with an approximate ¾ to 1 inch overlap.

9. The system of claim 1, wherein the electrical machine comprises a motor, and the formed coil comprises a stator coil.

10. An electrical machine formed coil insulation system, comprising:
    turn insulation comprising at least one layer of a mica-containing tape disposed over each successive turn of substantially the entire formed coil;
    multi-layer of mica ground wall insulation comprising at least one layer of a mica-containing tape disposed over multiple turns of substantially the entire coil, wherein the multi-layer comprises a mica-containing overlap of a mica-containing tape;
    slot corona suppression insulation disposed over the ground wall insulation of at least slot cell cavity sections of the coil and extending beyond ends of a core of the machine;
    voltage grading insulation disposed over at least a portion of the slot corona suppression insulation and extending beyond the slot corona suppression insulation at ends of the coil; and
    armor insulation disposed over ends of the coil and at least a portion of coil leads, wherein the turn insulation and the multi-layer of mica ground wall insulation extend over the slot cell sections of the coil, and wherein the slot cell sections of the coil are configured to be disposed in a slot cell of the electrical machine, wherein the mica ground wall insulation comprises at least 160 gm/m$^2$ of mica, and wherein the mica-containing tape is wound in ½ lap width overlap at a tension of between 16 to 18 ft-lbs wherein the coil comprises conductors having a gauge sized for operating at between approximately 6,900 and 16,000 volts.

* * * * *